(12) United States Patent
Hattori

(10) Patent No.: US 7,302,836 B2
(45) Date of Patent: Dec. 4, 2007

(54) METHOD FOR DETECTING STRAIN STATE OF TIRE, DEVICE FOR DETECTING STRAIN STATE, AND THE TIRE

(75) Inventor: Yutaka Hattori, Kanagawa (JP)

(73) Assignee: Yokohama Rubber Company, Tokyo (JP)

( * ) Notice: Subject to any disclaimer, the term of this patent is extended or adjusted under 35 U.S.C. 154(b) by 445 days.

(21) Appl. No.: 10/505,215

(22) PCT Filed: Jul. 18, 2003

(86) PCT No.: PCT/JP03/09169

§ 371 (c)(1),
(2), (4) Date: Aug. 20, 2004

(87) PCT Pub. No.: WO2004/013596

PCT Pub. Date: Feb. 12, 2004

(65) Prior Publication Data

US 2005/0081613 A1    Apr. 21, 2005

(30) Foreign Application Priority Data

Aug. 2, 2002   (JP)   ............................. 2002-226050

(51) Int. Cl.
G01M 17/02    (2006.01)
(52) U.S. Cl. .......................................... 73/146; 340/442
(58) Field of Classification Search ................. 73/146, 73/146.2, 146.3, 146.4, 146.5; 340/442, 340/443, 445, 446, 447, 448
See application file for complete search history.

(56) References Cited

U.S. PATENT DOCUMENTS 4,953,393 A    9/1990   Galasko et al.

5,895,854 A    4/1999   Becherer et al.

(Continued)

FOREIGN PATENT DOCUMENTS

EP    0 832 765 A2    4/1998

OTHER PUBLICATIONS

International Search Rerport for PCT/JP03/09169 mailed on Nov. 4, 2003.

*Primary Examiner*—Eric S. McCall
(74) *Attorney, Agent, or Firm*—Knobbe Martens Olson & Bear LLP

(57) ABSTRACT

The present invention provides a tire distortion detecting method, a distortion detector, and a tire which can reduce the occurrence of a deterioration and can be used for a control system such as a stability control system. That is, series of conductors composed of a plurality of conductor pieces 101 and 102 are provided in two different layers. The conductor pieces 101 and 102 are embedded in lines at predetermined intervals in the circumferential direction of a tire 300. A pulsed electromagnetic wave is radiated to the surfaces of metal foils 101 and 102 in the layers from a monitoring device 200 provided in a tire house 400 of a vehicle. The monitoring device 200 receives a pulsed electromagnetic wave reflected from the metal foils 101 and 102 in the layers or a member other than the metal foils. Time from the radiation of a pulsed electromagnetic wave to the reception of a reflected pulsed magnetic wave is measured repeatedly, time at which no distortion occurs on the tire 300 is stored as a reference value, and the measured time and the stored reference value are compared with each other to detect a distortion of the tire 300.

9 Claims, 12 Drawing Sheets

U.S. PATENT DOCUMENTS

| | | |
|---|---|---|
| 6,308,758 B1 | 10/2001 | Cetin et al. |
| 6,959,592 B2 * | 11/2005 | Caretta ................ 73/146 |
| 2003/0046992 A1 * | 3/2003 | Caretta ................ 73/146 |
| 2004/0021559 A1 * | 2/2004 | O'Brien ................ 340/445 |
| 2004/0216520 A1 * | 11/2004 | Caretta ................ 73/146 |
| 2005/0057346 A1 * | 3/2005 | Ogawa ................ 340/438 |
| 2005/0146423 A1 * | 7/2005 | Hattori ................ 340/438 |

* cited by examiner

METHOD FOR DETECTING STRAIN STATE OF TIRE, DEVICE FOR DETECTING STRAIN STATE, AND THE TIRE

TECHNICAL FIELD

The present invention relates to a tire distortion detecting method, a distortion detector, and a tire thereof that detects a distortion of the tire during the running of a vehicle.

BACKGROUND ART

Conventionally cautions for the safe driving of a vehicle include a proper setting of an air pressure in a tire of the vehicle and attention to the wear of the tire. For example, a reduced air pressure in a tire increases the occurrence of flat tires and causes a burst at high speed, resulting in a serious accident. Therefore, drivers have to check tires on a daily basis.

However, even if tires are checked and preferred conditions are maintained for the tires, when a friction between a road surface and the tires decreases, for example, when a road surface is wet on a rainy day, skids occur under braking and move the vehicle in an unexpected direction, resulting in some accidents.

In order to prevent accidents caused by skids and a fast start, Anti-Lock Brake System (hereinafter referred to as ABS) and a traction control system are developed, and a stability control system having a YAW sensor is also developed in addition to these systems.

For example, ABS is a system of detecting a rotating state of each tire and controlling a braking force based on detection results so as to prevent the tires from locking.

The number of revolutions, an air pressure, a distortion, and so forth of each tire are detected as a rotating state of tires and detection results can be used for control.

For example, a detector for automatically detecting an air pressure of a tire is known. Such a detector uses a so-called "indirect" method of detecting an air pressure of a tire. In this method, data is inputted from an ABS speed sensor to estimate an air pressure of a tire.

As a method of detecting an air pressure of a tire that is used for the detector, the following methods are known: (a) a method of calculating a change (distortion) in the rolling radius of a tire by an angular speed of rotation of a wheel, the change being caused by a reduced air pressure, and (b) a method of performing FFT (Fast Fourier Transform) on an input signal and performing calculations using a change in the natural frequency of a tire.

On the other hand, as examples of a sensor and a tire that are used for the ABS, the traction control system, and the stability control system, U.S. Pat. No. 5,895,854 (hereinafter referred to as conventional example 1) and U.S. Pat. No. 6,308,758 (hereinafter referred to as conventional example 2) are known.

In conventional example 1, magnetic bar codes are provided which are arranged in lines in the circumferential direction of the side wall of a tire with adjacent parts alternately changed in polarity, and the bar codes are read by a sensor fixed on a chassis and a axis arm. Thus, the rotating speed of the tire can be detected. Further, the magnetic bar codes are provided in two or more lines in the radius direction of the tire, thereby calculating a force and deformation in the radius direction of the tire based on a phase difference between the detection results of the inner and outer magnetic bar codes.

In contrast to conventional example 1 having difficulty in forming magnetic bands at small intervals, conventional example 2 reduces the difficulty and discloses a tire improved in the resolution of magnetic bar codes arranged in lines in the circumferential direction of the side wall of the tire with adjacent parts alternately changed in polarity.

However, in conventional examples 1 and 2, since the magnetic bands are formed on the side wall when the tire is manufactured, it is quite troublesome to set the magnetic force of the magnetic band at the optimum value. That is, when the magnetic force of the magnetic band is much higher than the optimum value, a magnetic substance such as iron sand and an iron piece on a road surface may be adsorbed. Further, when the magnetic force of the magnetic band is lower than the optimum value, the detection of the sensor becomes difficult.

Moreover, the magnetic bands may gradually decrease in magnetization due to heat generated on the tire during the running of a vehicle and the detection of the sensor may become more difficult as running time increases.

In view of the above problems, an object of the present invention is to provide a tire distortion detecting method, a distortion detector, and a tire that can reduce the occurrence of a deterioration and can be used for a control system such as a stability control system.

DISCLOSURE OF THE INVENTION

A tire distortion detecting method of the present invention uses a tire, in which a plurality of conductor pieces embedded in lines at predetermined intervals in the circumferential direction of the tire are embedded in two or more different layers, and a monitoring device which has a scanner unit provided in a tire house of a vehicle. When a distortion of a rotating tire is detected by using the tire and the monitoring device, a pulsed electromagnetic wave is radiated to the surface of the conductor piece along the lines of the conductor pieces in each of the layers. Further, the scanner unit receives the pulsed electromagnetic wave reflected from the conductor piece in each of the layers and a member other than the conductor pieces. The monitoring device repeatedly measures time from when the scanner unit radiates the pulsed electromagnetic wave to when the scanner unit receives the reflected pulsed electromagnetic wave. The monitoring device stores, as a reference value, time at which no distortion occurs on the tire and compares an actually measured time with the stored reference value to detect a distortion of the tire.

According to the tire distortion detecting method of the present invention, the pulsed electromagnetic wave radiated from the scanner unit is reflected by the conductor piece or another member having a characteristic of reflecting an electromagnetic wave, and the reflected pulsed electromagnetic wave is received by the scanner unit.

Time from when the scanner unit radiates a pulsed electromagnetic wave to when the scanner unit receives the reflected wave, i.e., the round-trip time of the pulsed electromagnetic wave changes according to a distance between the scanner unit and a reflector for reflecting the pulsed electromagnetic wave. Further, when a distortion of the tire changes, a difference in the round-trip time of a pulsed electromagnetic wave also changes that corresponds to each of the conductor pieces embedded in the different layers. Moreover, when a distortion of the tire changes, the conductor pieces are displaced according to the distortion and a pulsed electromagnetic wave radiated from the scanner unit is reflected to the scanner unit by a member other than the conductor pieces. Therefore, it is possible to detect a distortion of the tire by the round-trip time of a pulsed electromagnetic wave or a difference in the round-trip time of the different layers.

Besides, according to the tire distortion detecting method of the present invention, the monitoring device radiates one or more pulsed electromagnetic waves in an interval of a smaller distance or length, out of a distance between the conductor pieces adjacent to each other in the circumferential direction of the tire or the length of the conductor piece arranged in the circumferential direction of the tire, so that time measurement is conducted on all the conductor pieces and between the adjacent conductor pieces. The tire distortion detecting method of the present invention can obtain resolutions more than the number of the conductor pieces arranged in lines along the circumferential direction of the tire, thereby detecting a distortion with high accuracy.

Additionally, according to the tire distortion detecting method of the present invention, the monitoring device uses a frequency of 1 GHz or higher to radiate a pulsed electromagnetic wave. Thus, it is possible to reduce the influence of reflection made by a reinforcing metal in the tire, the reinforcing metal having a gap larger than the wavelength of the frequency.

Besides, a tire distortion detector is constituted of a tire, in which a plurality of conductor pieces embedded in lines at predetermined intervals in the circumferential direction of the tire are embedded in two or more different layers, and a monitoring device which has a scanner unit provided in a tire house of a vehicle.

The monitoring device comprises means for radiating a pulsed electromagnetic wave from the scanner unit to a surface of the conductor piece along the line of the conductor pieces in each of the layers of the tire, means which is provided in the scanner unit and receives the pulsed electromagnetic wave reflected by the conductor piece in each of the layers of the tire and a member other than the conductor piece, means for measuring time from the radiation of the pulsed electromagnetic wave to the reception of the reflected pulsed electromagnetic wave, means for alternately repeating the radiation of the pulsed electromagnetic wave and the reception of the reflected pulsed electromagnetic wave, means for storing, as a reference value, time at which no distortion occurs on the tire, and means for comparing the measured time and the stored reference value to detect a distortion of the tire.

According to the tire distortion detector of the present invention, the pulsed electromagnetic wave radiated from the scanner unit is reflected by the conductor piece or another member having a characteristic of reflecting an electromagnetic wave, and the reflected pulsed electromagnetic wave is received by the scanner unit.

Time from when the scanner unit radiates a pulsed electromagnetic wave to when the scanner unit receives the reflected wave, i.e., the round-trip time of the pulsed electromagnetic wave changes according to a distance between the scanner unit and a reflector for reflecting the pulsed electromagnetic wave.

Further, when a distortion of the tire changes, a difference in the round-trip time of a pulsed electromagnetic wave also changes that corresponds to each of the conductor pieces embedded in the different layers. Moreover, when a distortion of the tire changes, the conductor pieces are displaced according to the distortion and a pulsed electromagnetic wave radiated from the scanner unit is reflected to the scanner unit by a member other than the conductor pieces.

The monitoring device repeatedly measures the round-trip time of a pulsed electromagnetic wave and stores, as a reference value, time at which no distortion occurs on the tire. Further, the monitoring device compares time measured in the running of the vehicle with the stored reference value to detect a distortion of the tire. Therefore, it is possible to detect a distortion of the tire by the round-trip time of a pulsed electromagnetic wave or a difference in the round-trip time of a pulsed electromagnetic wave in the different layers of the tire.

Moreover, according to the tire distortion detector of the present invention, when a distortion is made detectable mainly on the tread of the tire, the conductor pieces are embedded in the tire so that the surfaces of the conductor pieces are almost in parallel with the surface of the tire tread.

Besides, according to the tire distortion detector of the present invention, when a distortion is made detectable mainly on the side wall of the tire, the conductor pieces are embedded in the tire so that the surfaces of the conductor pieces are almost in parallel with the surface of the side wall of the tire.

Additionally, according to the tire distortion detector of the present invention, the pulsed electromagnetic wave is set at a frequency of 1 GHz or higher in order to reduce the influence of reflection made by the reinforcing metal in the tire, the reinforcing metal having a gap larger than the wavelength of the frequency.

Moreover, according to the tire distortion detector of the present invention, at least in the outermost line of the conductor pieces relative to the axis of rotation of the tire at the center, the conductor pieces are arranged at regular intervals in the circumferential direction of the tire to set the length of the conductor piece in the circumferential direction of the tire equal to the length of a gap between the adjacent conductor pieces, so that measurement time changes at regular intervals when the tire having no distortion rotates at a fixed number of revolutions.

Besides, according to the tire distortion detector of the present invention, the conductor pieces are arranged so that in a second series of conductors provided inside a first series of conductors, the ends of the conductor piece in the circumferential direction of the tire overlap, by a predetermined length, the ends of the conductor piece in the circumferential direction of the tire in the first series of conductors which is outermost relative to the axis of rotation of the tire at the center.

According to the tire distortion detector of the present invention, when a distortion of the tire is larger than a predetermined amount, an overlap disappears between the conductor piece of the first series of conductors and the conductor piece of the second series of conductors and a gap appears between the series of conductors. The occurrence of the gap largely changes the round-trip time of a pulsed electromagnetic wave and thus it is possible to detect that a distortion of the tire has become larger than the predetermined amount.

Further, according to the present invention, as a tire used for the tire distortion detector, a tire is configured so that series of conductors are embedded in two or more different layers with a part having no overlapping surface, the series of conductors being composed of a plurality of conductor pieces embedded in lines at predetermined intervals in the circumferential direction of the tire.

Moreover, according to the tire of the present invention, when a distortion is made detectable mainly on the tread of the tire, the conductor pieces are embedded in the tire so that the surfaces of the conductor pieces are almost in parallel with the surface of the tire tread.

Besides, according to the tire of the present invention, when a distortion is made detectable mainly on the side wall of the tire, the conductor pieces are embedded in the tire so that the surfaces of the conductor pieces are almost in parallel with the surface of the side wall of the tire.

Additionally, according to the tire of the present invention, at least in the outermost line of the conductor pieces relative to the axis of rotation of the tire at the center, the conductor pieces are arranged at regular intervals in the circumferential direction of the tire to set the length of the conductor piece in the circumferential direction of the tire equal to the length of a gap between the adjacent conductor pieces.

Further, according to the tire of the present invention, the conductor pieces are arranged so that in a second series of conductors provided inside a first series of conductors, the ends of the conductor piece in the circumferential direction of the tire overlap, by a predetermined length, the ends of the conductor piece in the circumferential direction of the tire in the first series of conductors which is outermost relative to the axis of rotation of the tire at the center.

According to the tire of the present invention, the conductor pieces are arranged at regular intervals in the same layer.

According to the tire of the present invention, the conductor pieces of the layers are arranged so that the conductor pieces in the two different layers are alternately arranged in the circumferential direction of the tire.

According to the tire of the present invention, the conductor pieces of the layers in the tire are arranged so that the conductor pieces partly overlap each other in the circumferential direction of the tire.

According to the tire of the present invention, the conductor pieces of the layers in the tire are displaced from each other in the width direction of the tire.

BEST MODES FOR CARRYING OUT THE INVENTION

The following will describe embodiments of the present invention in accordance with the accompanying drawings.

Figure 1:
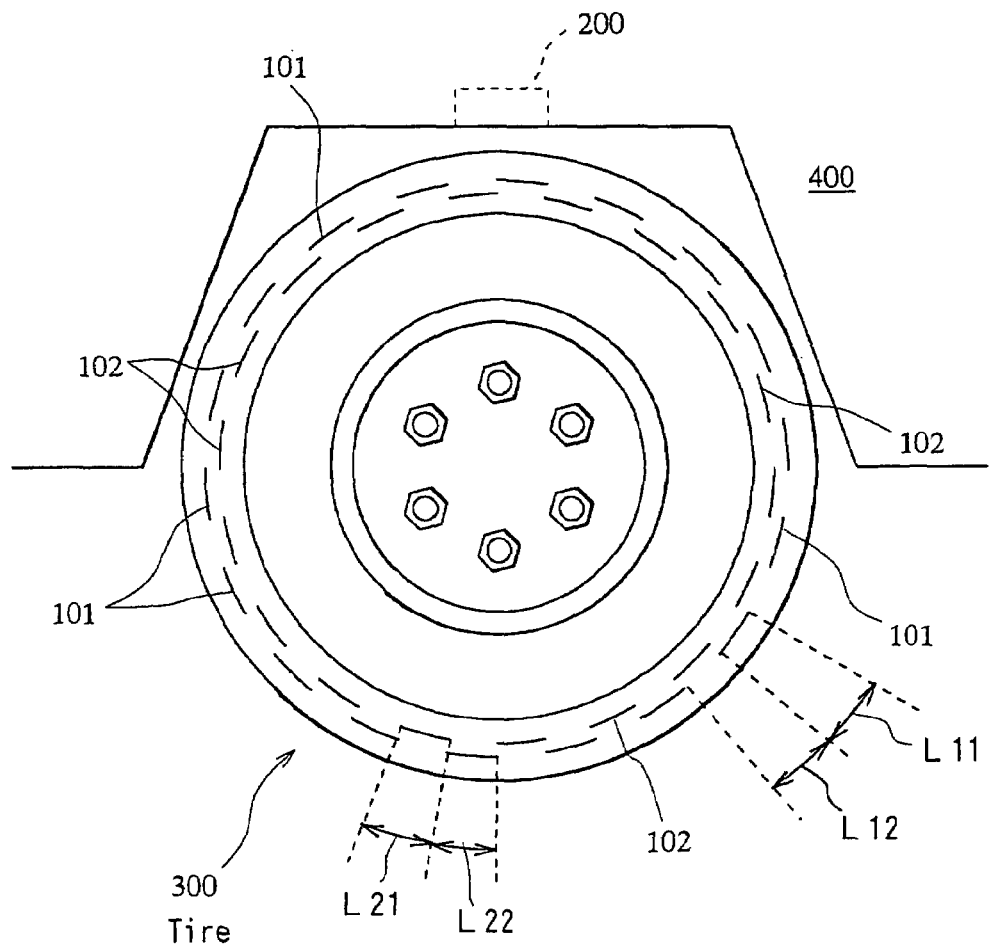
FIG. 1 is a schematic diagram showing a state of mounting a tire distortion detector into a vehicle according to Embodiment 1 of the present invention.

FIG. 1 is a schematic view showing a mounting state of a tire distortion detector into a vehicle according to Embodiment 1 of the present invention. In FIG. 1, reference numerals 101 and 102 denote metal foils (conductor piece), reference numeral 200 denotes a monitoring device, reference numeral 300 denotes a tire, and reference numeral 400 denotes a tire house.

The metal foils 101 and 102 are made of a metal such as an aluminum foil, which reflects an electromagnetic wave and is shaped like a rectangle with a predetermined width and a predetermined length.

Figure 2:
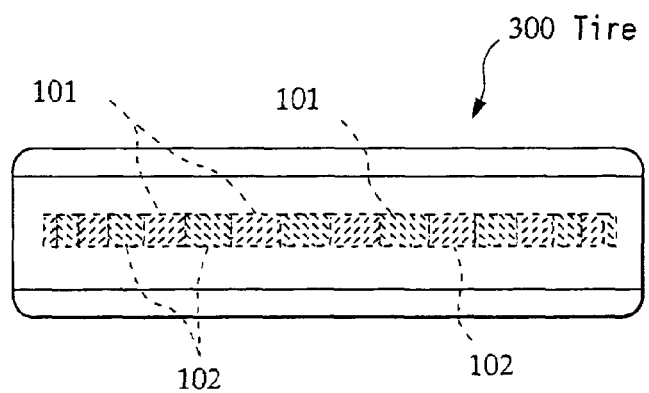
FIG. 2 is a top view showing the tire according to Embodiment 1 of the present invention.
Figure 3:
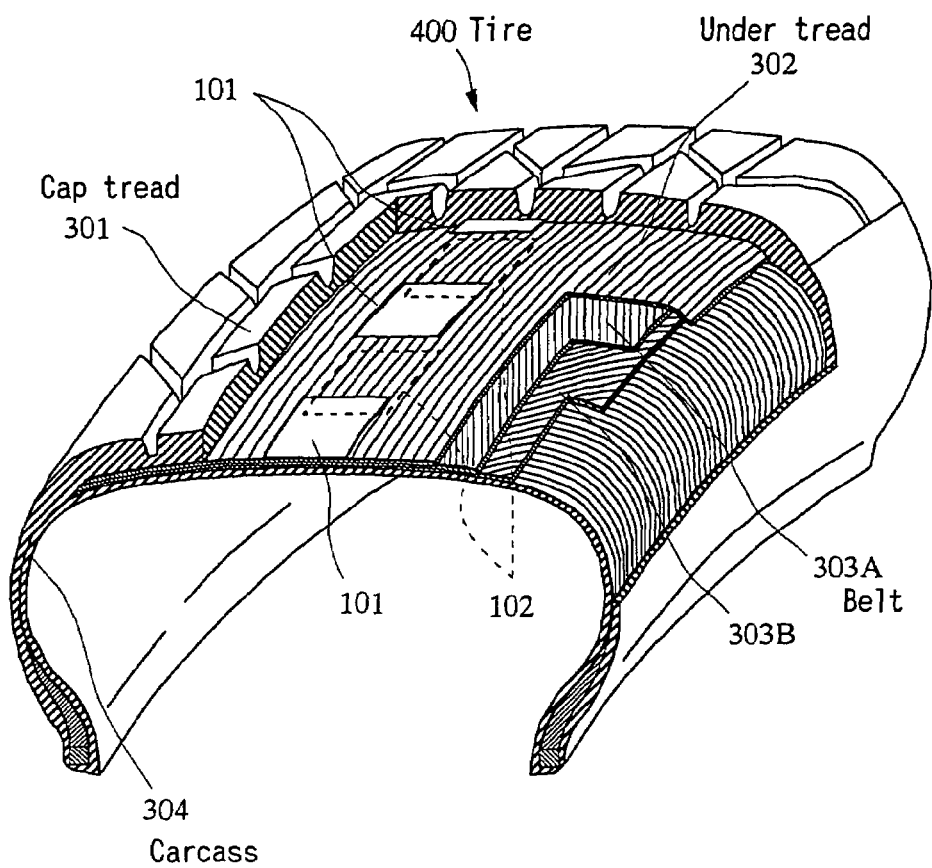
FIG. 3 is cutaway view showing a state of embedding metal foils in the tire according to Embodiment 1 of the present invention.
Figure 4:
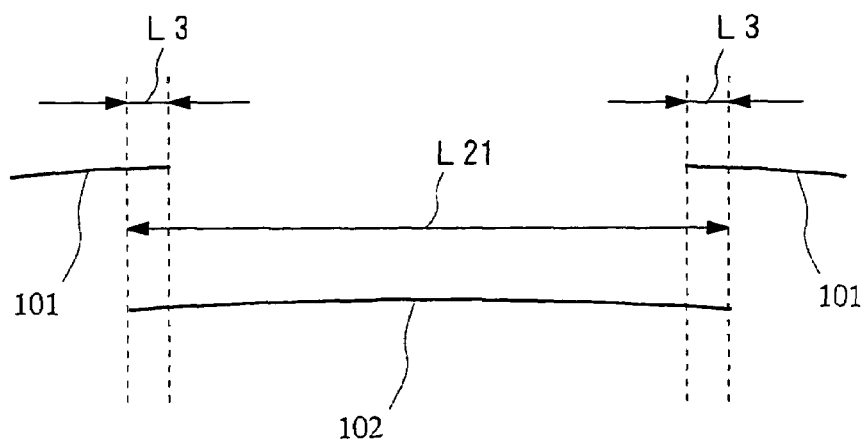
FIG. 4 is a diagram for explaining an overlapping state of the metal foils of different layers according to Embodiment 1 of the present invention.

As shown in FIGS. 2 to 4, the plurality of metal foils 101 are arranged in lines at regular intervals along the circumferential direction, which has the axis of rotation of the tire 300 at the center, in a layer between a cap tread 301 and an under tread 302 so that the surfaces of the metal foils 101 are almost in parallel with the surface of the cap tread 301 and the long sides of the metal foils 101 match the circumferential direction which has the axis of rotation of the tire 300 at the center. Further, a distance between the adjacent metal foils 101 (length L12 of a gap) is set equal to a length L11 of the metal foil 101.

Moreover, the plurality of metal foils 102 are arranged in lines at regular intervals L22 along the circumferential direction, which has the axis of rotation of the tire 300 at the center, between a carcass 304 and a belt 303B so that the surfaces of the metal foils 102 are almost in parallel with the surface of the cap tread 301 and the long sides of the metal foils 102 match the circumferential direction which has the axis of rotation of the tire 300 at the center. Additionally, as shown in FIG. 4, a length L21 of the long side of the metal foil 102 is set so that the both ends in the longitudinal direction of the metal foil 102 each overlap the ends of the different metal foils 101 by a length L3.

Further, the metal foils 101 and 102 are arranged so that the center in the width direction of a series of conductors composed of the plurality of metal foils 101 substantially overlaps the center in the width direction of a series of conductors composed of the plurality of metal foils 102.

The monitoring device 200 is provided in the tire house 400 of the vehicle so as to correspond with the top of the tire 300. The tire distortion detector of the present embodiment is constituted of the tire 300, which has the metal foils 101 and 102 embedded therein, and the monitoring device 200.

Figure 5:
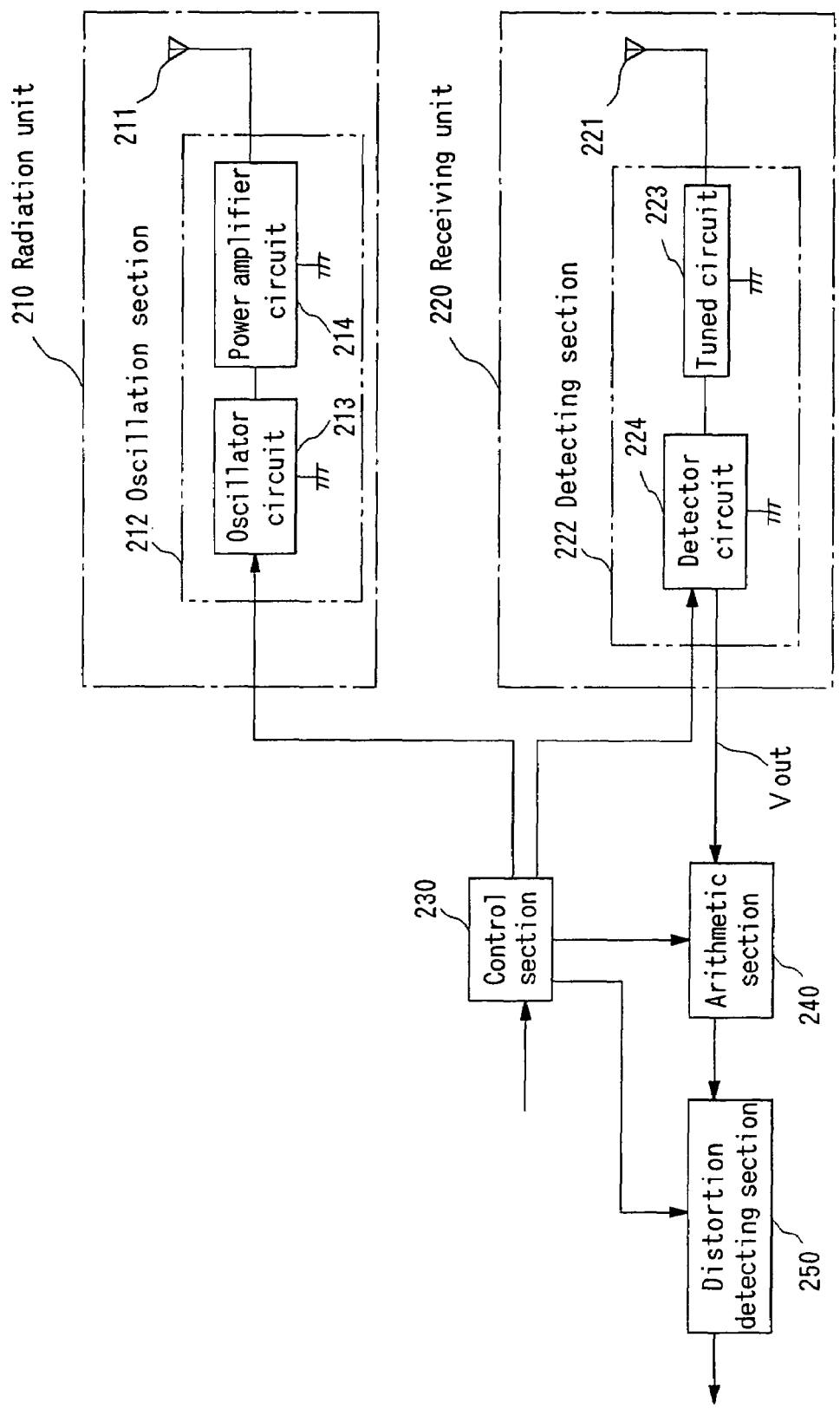
FIG. 5 is a structural diagram showing a specific example of an electrical circuit of a monitoring device according to Embodiment 1 of the present invention.

As shown in FIG. 5, the monitoring device 200 is constituted of a radiation unit 210, a receiving unit 220, a control section 230, an arithmetic section 240, and a distortion detecting section 250.

The radiation unit 210 is constituted of an antenna 211, which radiates an electromagnetic wave at a predetermined frequency of 2.45 GHz, and an oscillation section 212. In response to an instruction from the control section 230, an electromagnetic wave at the above frequency is radiated like a pulse from the antenna 211.

The oscillation section 212 is constituted of an oscillator circuit 213 and a power amplifier circuit 214. The oscillator circuit 213 is constituted of a known PLL circuit and so on and outputs a carrier wave at a frequency of 2.45 GHz in response to an instruction from the control section 230.

The power amplifier 214 amplifies a carrier wave having been outputted from the oscillator circuit 131 and feeds the carrier wave as a pulse to the antenna 211. Thus, a pulsed electromagnetic wave at 2.45 GHz is radiated from the antenna 211. Additionally, high-frequency power outputted from the power amplifier circuit 214 is set at a value enabling the metal foils 101 and 102 to reflect the pulsed electromagnetic wave, which has been radiated from the antenna 211 for radiating an electromagnetic wave in the monitoring device 200, as shown in FIG. 1 and enabling the antenna 221, which will be described later, to receive the reflected pulsed electromagnetic wave.

The receiving unit 220 is constituted of an antenna 221, which receives an electromagnetic wave at a frequency of 2.45 GHz, and a detecting section 222. In response to an instruction from the control section 230, the receiving unit 220 converts the high-frequency energy of an electromagnetic wave, received by the antenna 221 in a predetermined frequency band width including 2.45 GHz into direct-current voltage and outputs the voltage as a detection voltage Vout.

The detecting section 222 is constituted of a tuned circuit 223 and a detector circuit 224.

The tuned circuit 223 is tuned to an electromagnetic wave in a frequency band of ±Δf1 having its center at 2.45 GHz, and the turned circuit 223 converts high-frequency energy into electric energy and outputs the electric energy.

The detector circuit 224 converts the electric energy having been outputted from the tuned circuit 223 into direct-current voltage and outputs the voltage as the detection voltage Vout.

The control section 230 makes initial settings when receiving an initial setting instruction from a host device (not shown) and the control section 230 detects a distortion when receiving an instruction to detect distortion from the host device.

The initial settings are made when the tire 300 rotates with no distortion during the running of the vehicle.

In the initial settings, the control section 230 notifies the distortion detecting section 250 of the initial settings and then drives the oscillation section 212 to radiate the pulsed electromagnetic wave with a pulse width of time t1 at predetermined time intervals, and the control section 230 notifies the arithmetic section 240 of the timing of radiating the pulsed electromagnetic wave. Besides, it is preferable that the time intervals for radiating the pulsed electromagnetic wave are set so as to obtain one or more reflected waves from each of the metal foils 101 and 102. It is needless to say that a distortion can be accurately detected by reducing the time intervals for radiating the pulsed electromagnetic wave.

The arithmetic section 240 measures time T from when the notification about the timing of radiation is received to when the detection voltage Vout exceeds a predetermined threshold value, that is until the reception of the pulsed electromagnetic wave having been reflected from the metal foils 101 and 102 and so on, and the arithmetic section 240 outputs the value to the distortion detecting section 250.

In the initial settings, the distortion detecting section 250 stores measurement time periods, which are outputted from the arithmetic section 240, sequentially in time sequence and stores a round-trip time T1 of a pulsed electromagnetic wave reflected from the metal foil 101 and a round-trip time T2 of a pulsed electromagnetic wave reflected from the metal foil 102, based on the stored values at the completion of the initial settings. Further, the distortion detecting section 250 calculates an average value T avg of measurement times T in initial setting time and stores the average value T avg. Furthermore, the distortion detecting section 250 outputs the round-trip times T1 and T2 and the average value T avg to the host device.

In the initial settings, when the settings may be changed by the speed of the vehicle, i.e., the number of revolutions of the tire 300, it is preferable to make the settings at a plurality of speeds and determine round-trip times T1 and T2 and an average value T avg at each of the speeds.

Further, in the distortion detection, the control section 230 notifies the distortion detecting section 250 of distortion detection and then drives the oscillation section 212 to radiate a pulsed electromagnetic wave with a pulse width of time t1. Moreover, the control section 230 notifies the arithmetic section 250 of the timing of radiating the pulsed electromagnetic wave.

The arithmetic section 240 measures time T from when the notification about the timing of radiation is received to when the detection voltage Vout exceeds the predetermined threshold value, that is until the reception of the pulsed electromagnetic wave having been reflected from the metal foils 101 and 102 and so on, and the arithmetic section 240 outputs the value to the distortion detecting section 250.

The distortion detecting section 250 calculates a difference T dif (=T−T avg) between the measurement time T, which is outputted from the arithmetic section 240, and the stored average value T avg, and the distortion detecting section 250 outputs the difference T dif and the measurement time T sequentially in time sequence to the host device.

The difference T dif and the measurement time T may be outputted to the host device at other predetermined time intervals and may not be outputted every time a measurement is performed. This setting is preferably made as necessary according to the diameter of the tire 300, the length L11 and L21 and the intervals L12 and L22 of the metal foils 101 and 102, the processing speed of the arithmetic section 240, or the requests from the host device.

The following will describe a tire distortion detecting method using the detector configured thus.

Figure 6:
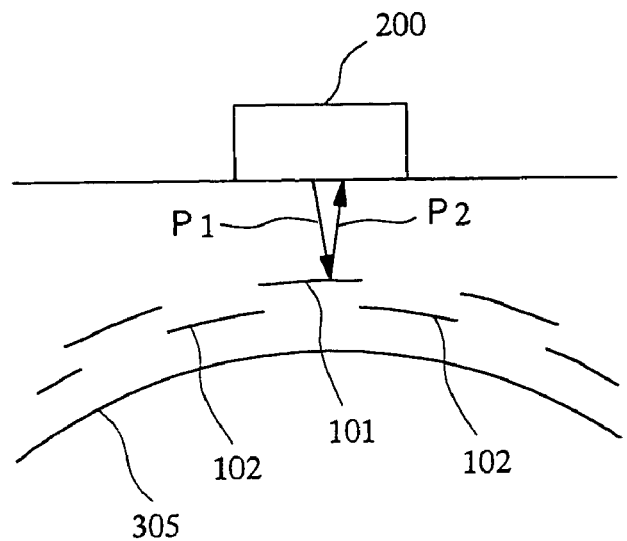
FIG. 6 is a diagram for explaining a method of detecting a distortion of the tire according to Embodiment 1 of the present invention.
Figure 7:
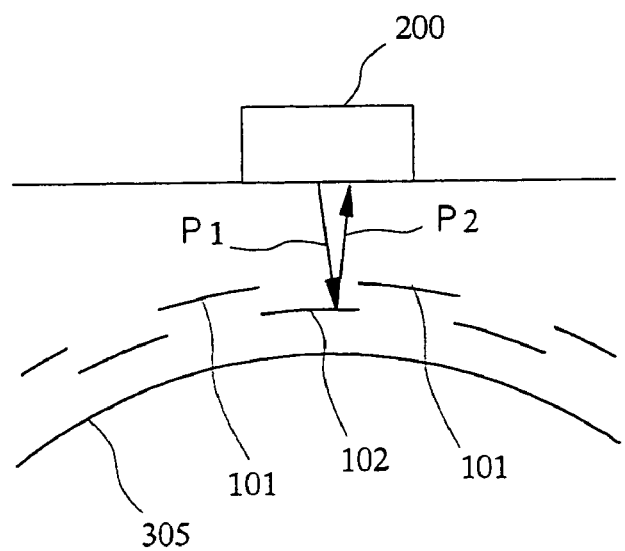
FIG. 7 is a diagram for explaining the method of detecting a distortion of the tire according to Embodiment 1 of the present invention.

When no distortion occurs on the tire 300, as shown in FIGS. 6 and 7, a pulsed electromagnetic wave P1 radiated from the monitoring device 200 is reflected on the metal foil 101 or the metal foil 102 and is received as a reflected wave P2 by the monitoring device 200.

Figure 8:
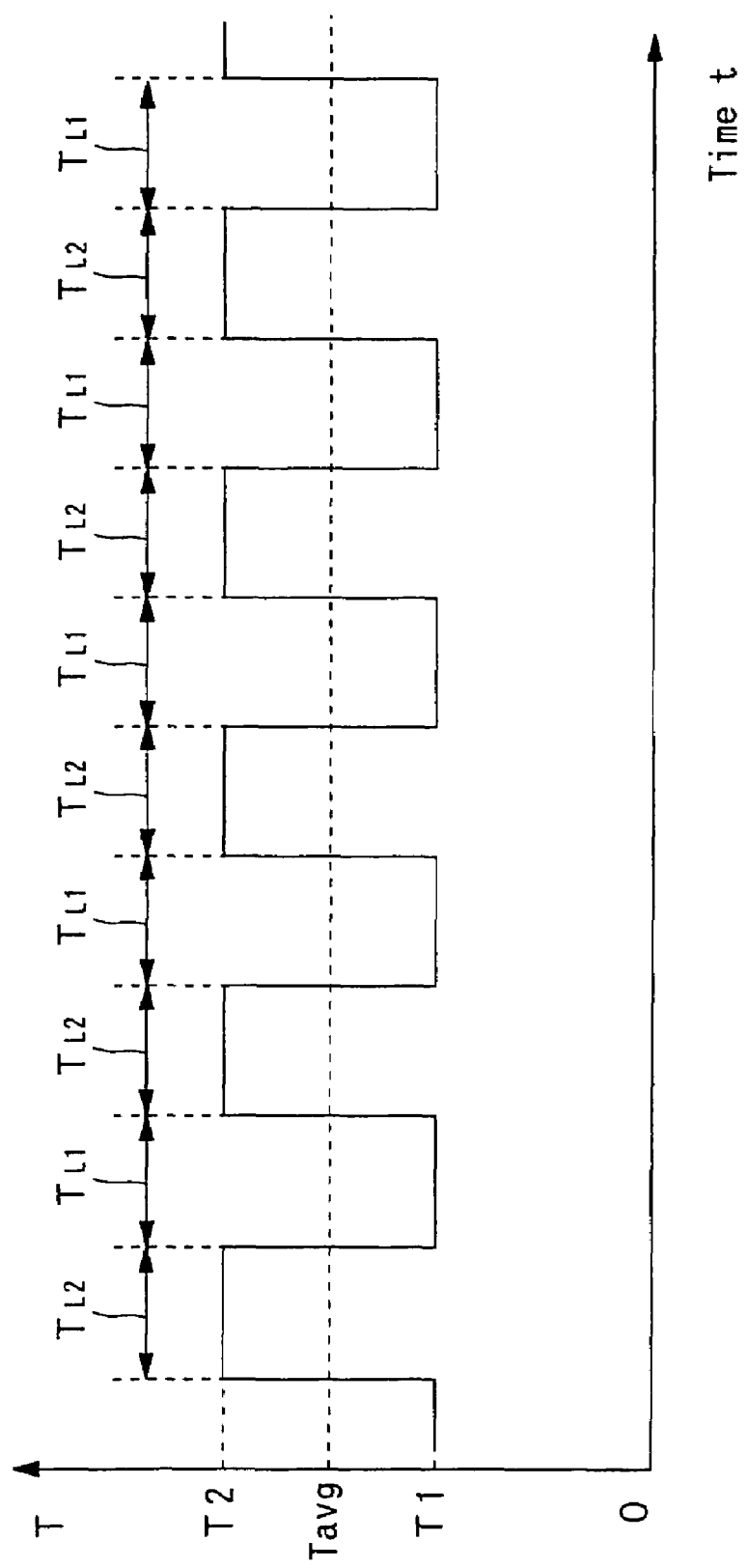
FIG. 8 is a timing chart for explaining the method of detecting a distortion of the tire according to Embodiment 1 of the present invention.

At this point, the round-trip time T of the pulsed electromagnetic wave that is measured by the monitoring device 200 repeatedly changes between the time T1 and the time T2 as shown in FIG. 8. Further, time $T_{L1}$ keeping the measurement time T1 and time $T_{L2}$ keeping the measurement time T2 are maintained almost constant according to the length L11 of the metal foil 101, the interval L12 thereof, and the number of revolutions of the tire 300.

Figure 9:
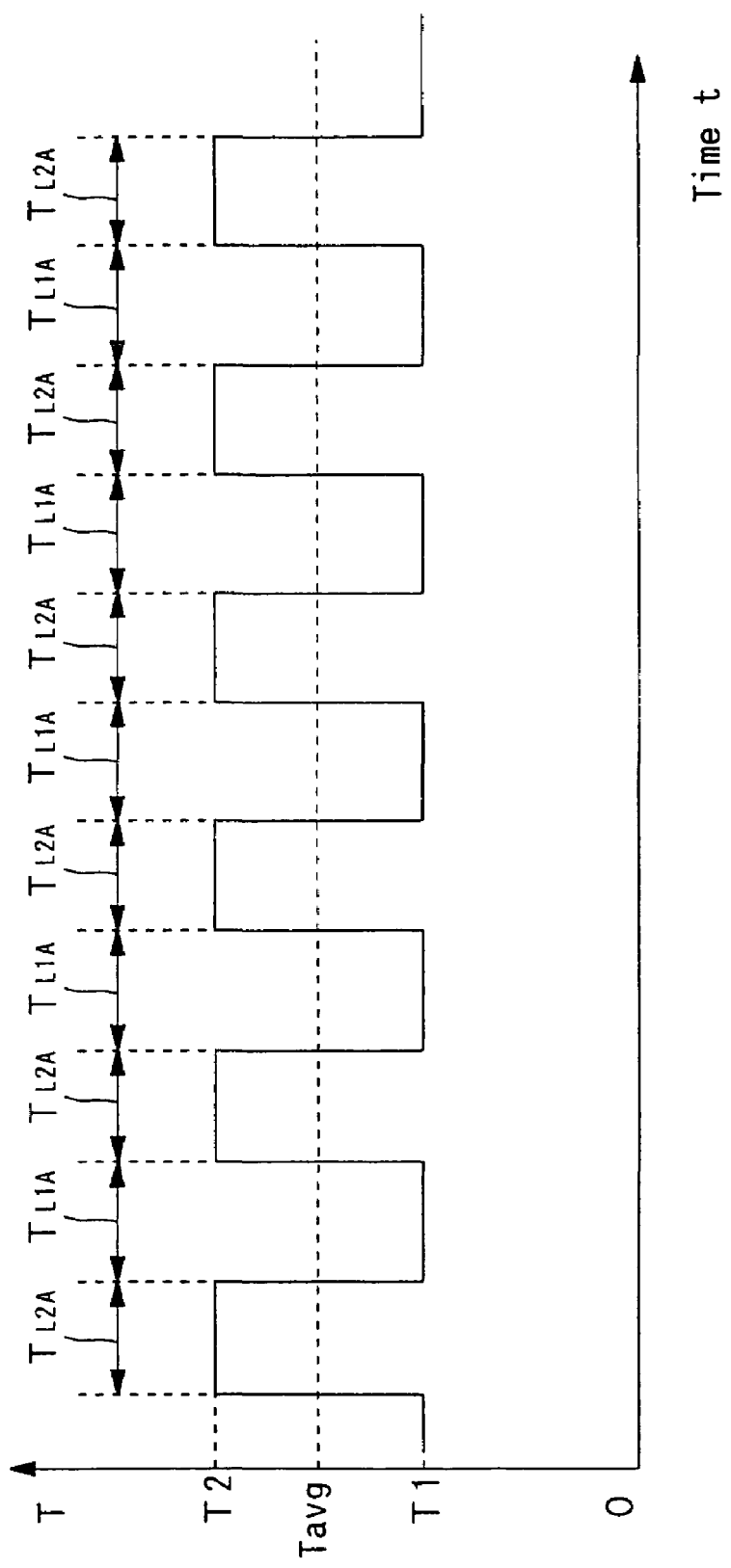
FIG. 9 is a timing chart for explaining the method of detecting a distortion of the tire according to Embodiment 1 of the present invention.

On the other hand, when the tire 300 has the same number of revolutions and a pressure is applied from the front and back to the top of the tire 300 so as to compress the top of the tire 300, the length L11 and the interval L12 of the metal foil 101 are reduced. Hence, as shown in FIG. 9, time $T_{L1A}$ keeping the measurement time T1 and time $T_{L2A}$ keeping the measurement time T2 are smaller than the time $T_{L1}$ and the time $T_{L2}$ during which no distortion occurs.

Figure 10:
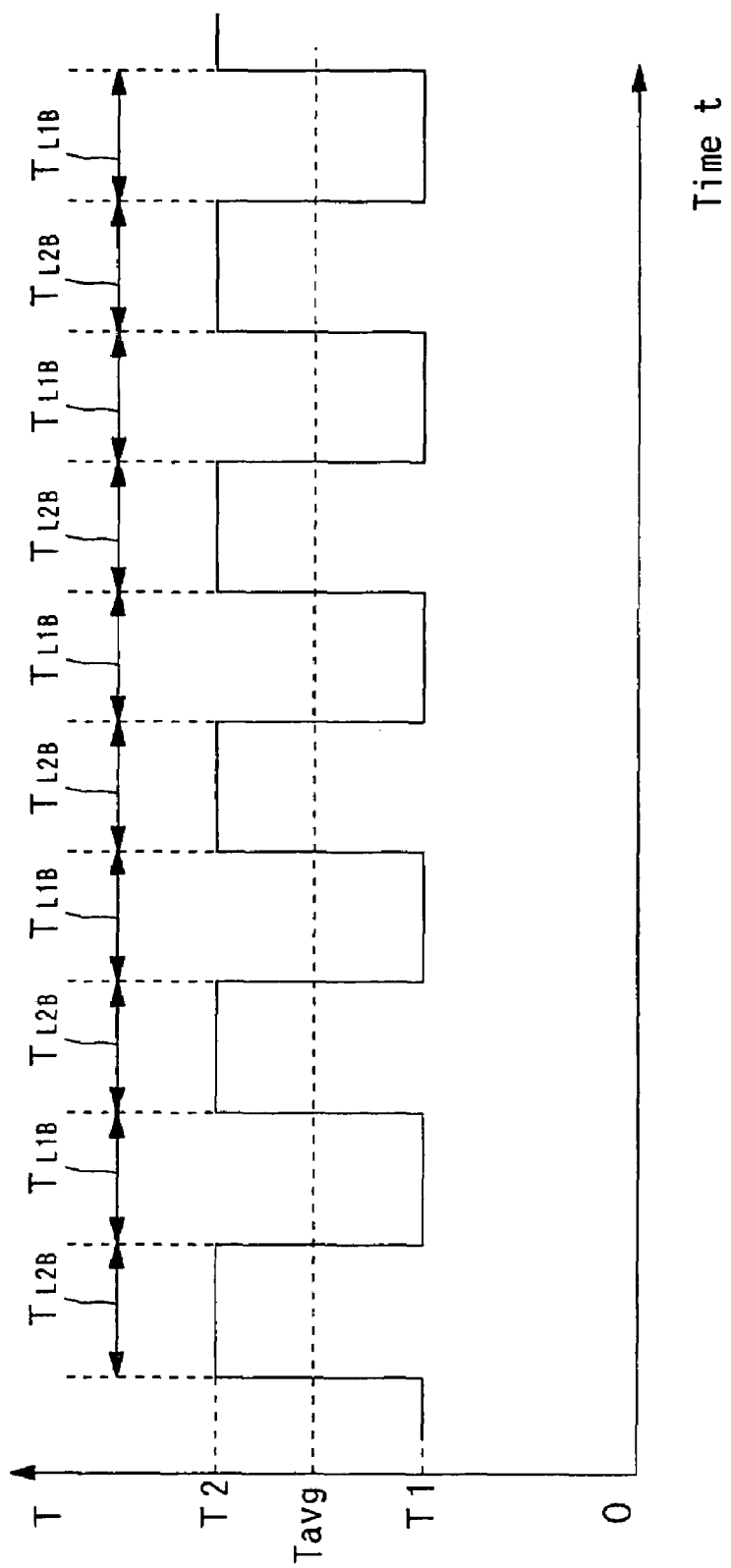
FIG. 10 is a timing chart for explaining the method of detecting a distortion of the tire according to Embodiment 1 of the present invention.
Figure 11:
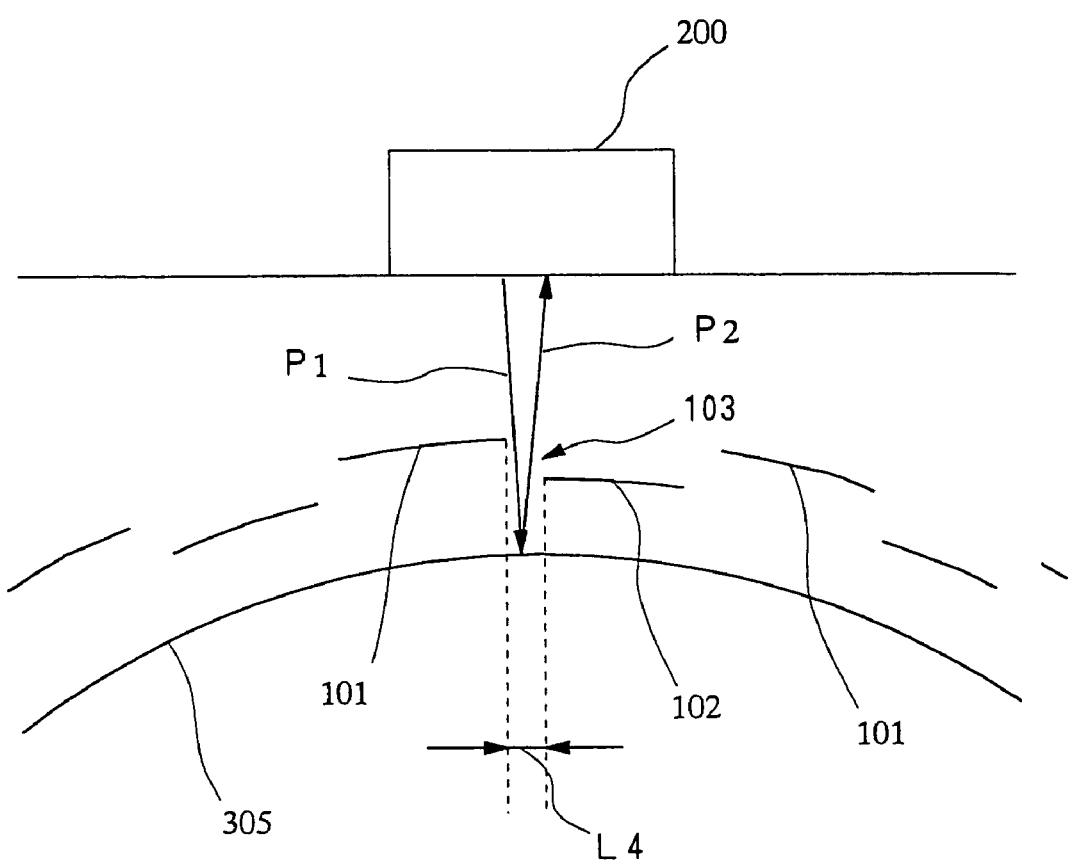
FIG. 11 is a diagram for explaining the method of detecting a distortion of the tire according to Embodiment 1 of the present invention.

Moreover, when the tire 300 has the same number of revolutions and a pressure is applied from the top of the tire 300 to the front and back so as to expand the top of the tire 300, the length L11 and the interval L12 of the metal foil 101 are increased. Hence, as shown in FIG. 10, time $T_{L1B}$ keeping the measurement time T1 and time $T_{L2B}$ keeping the measurement time T2 are larger than the time $T_{L1}$ and the time $T_{L2}$ during which no distortion occurs.

Furthermore, when the pressure from the top of the tire 300 to the front and back increases, a part having the metal foil 101 and the metal foil 102 overlapping in the circumferential direction of the tire (an overlap with the length L3) disappears and a gap 103 with a length L4 appears between the metal foil 101 and the metal foil 102. When the pulsed electromagnetic wave P1 radiated from the monitoring device 200 is caused to be incident into the gap 103, the pulsed electromagnetic wave P1 is reflected by an electromagnetic reflector, for example, a rim 305 positioned closer to the axis of rotation of the tire than the metal foil 102, and the reflected wave P2 is received by a monitor unit 200.

Figure 12:
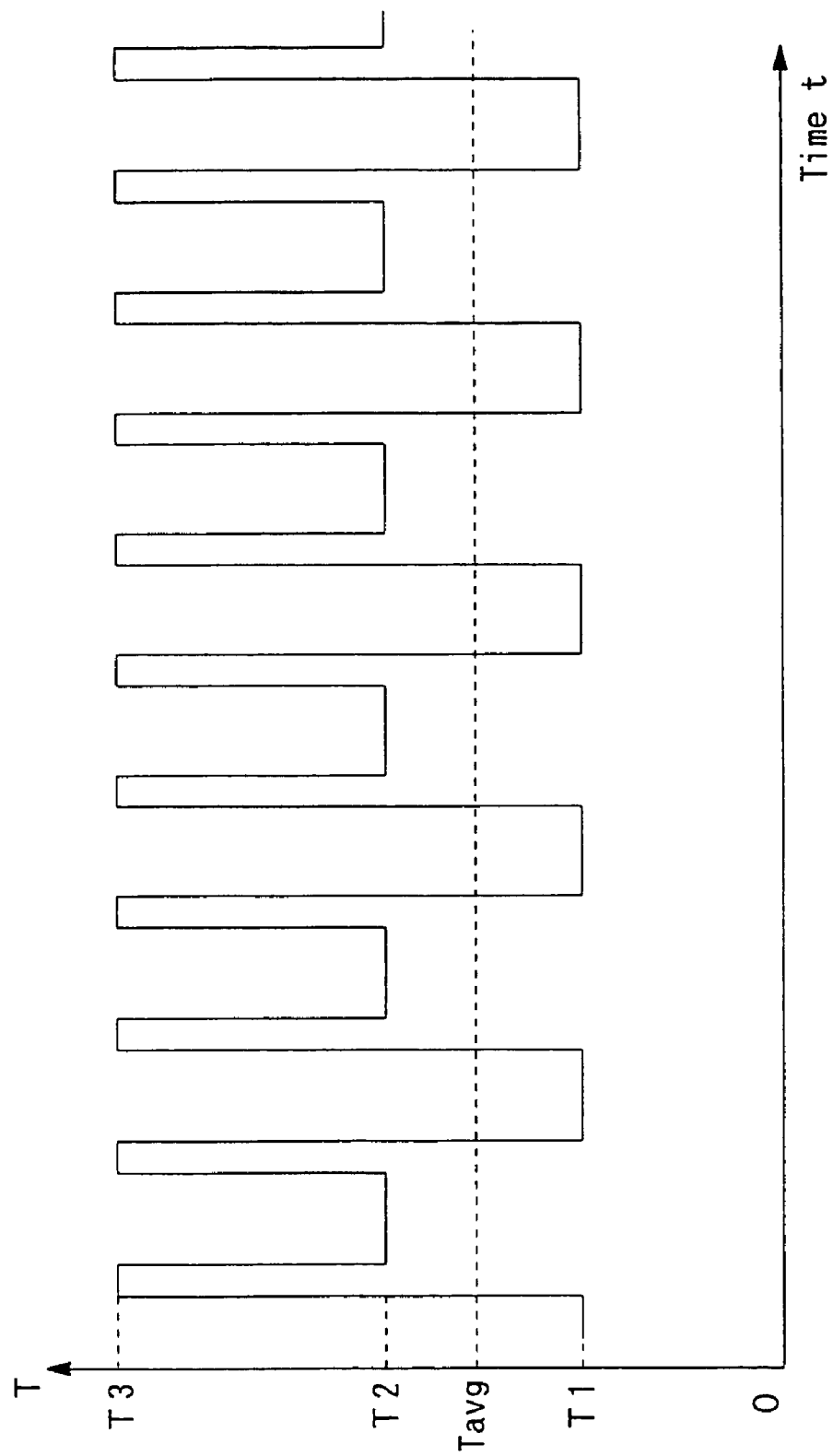
FIG. 12 is a timing chart for explaining the method of detecting a distortion of the tire according to Embodiment 1 of the present invention.

At this point, as shown in FIG. 12, the round-trip time T of the pulsed electromagnetic wave is equal to time T3 which is larger than the round-trip time T2 of the reflection from the metal foil 102.

Therefore, a distortion of the tire 300 can be detected by using the difference T dif (=T−T avg) outputted from the distortion detecting section 205.

Figure 13:
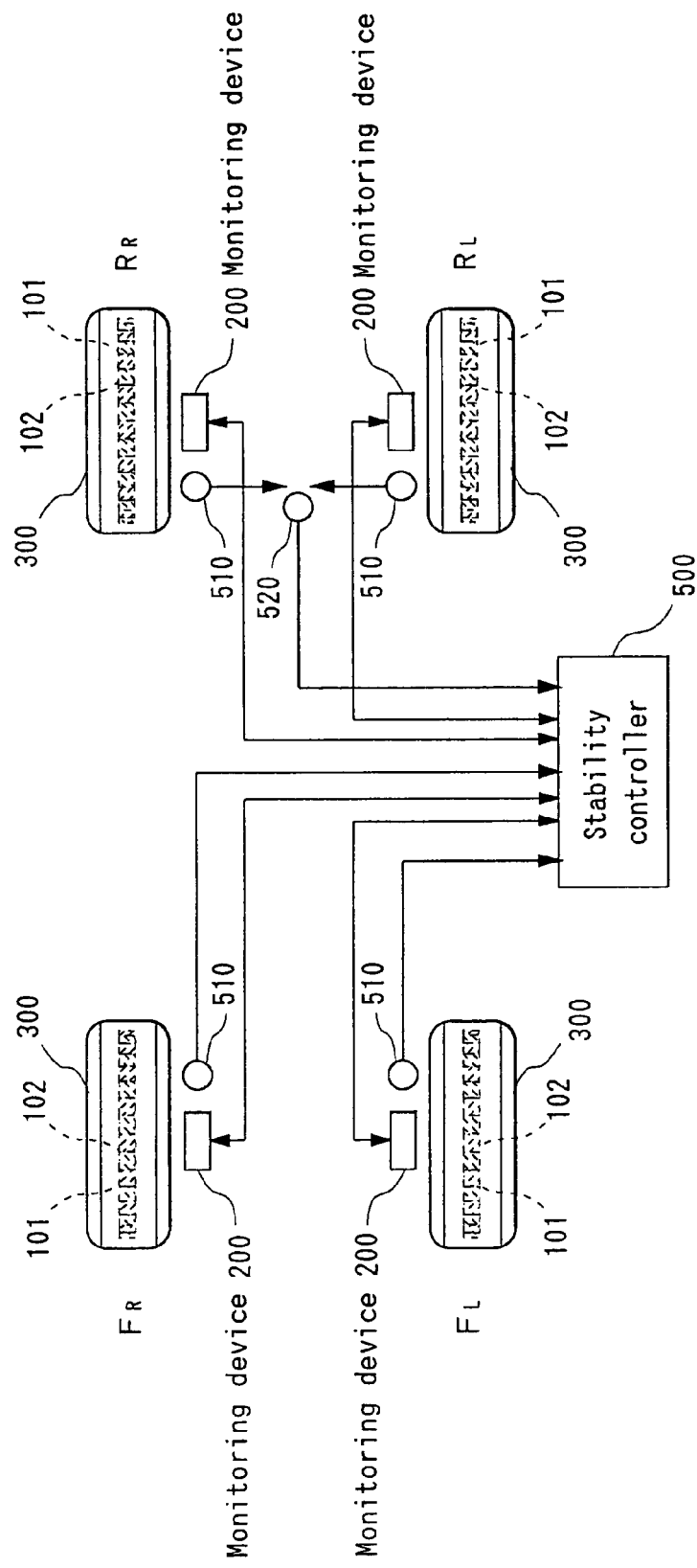
FIG. 13 is a diagram for explaining a use example of the tire distortion detector according to Embodiment 1 of the present invention.

For example, the tire distortion detector is applicable to a stability controller 500 shown in FIG. 13. A conventional and typical stability controller captures detection results outputted from sensors 510 and 520, which detect the number of revolutions of the tire 300 mounted in the vehicle, to perform stability control. By adding the stability controller 500, in which the tire 300 and the monitoring device 200 are provided and detection results outputted from the monitoring device 200 are captured to perform stability control, to the conventional configuration, it is possible to perform control with higher accuracy. In this case, an instruction from the monitoring device 200 to the control section 230 is outputted from the stability controller 500.

Figure 14:
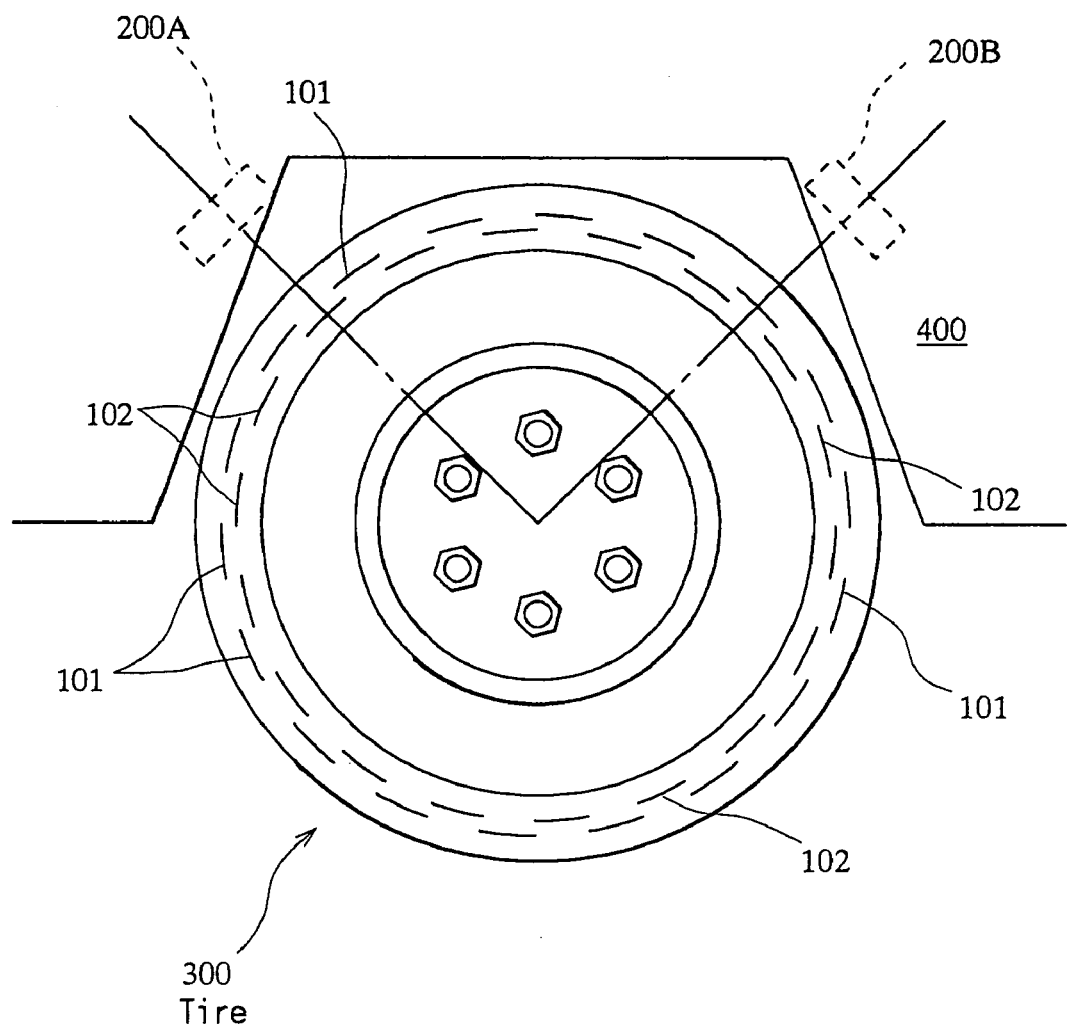
FIG. 14 is a schematic diagram showing a state of mounting a tire distortion detector into a vehicle according to Embodiment 2 of the present invention.

Further, as shown in FIG. 14, Embodiment 2 of the present invention has two monitoring devices 200A and 200B at the front and back of the top of a tire house 400. In this case, an electromagnetic wave may be radiated and received in a time-sharing manner by the monitoring devices 200A and 200B. Thus, a distortion can be detected on two points of a tire 300. Additionally a monitoring device 200 may be provided on three or more points of the tire house 400 so as to detect a distortion on three points of the tire 300.

Figure 15:
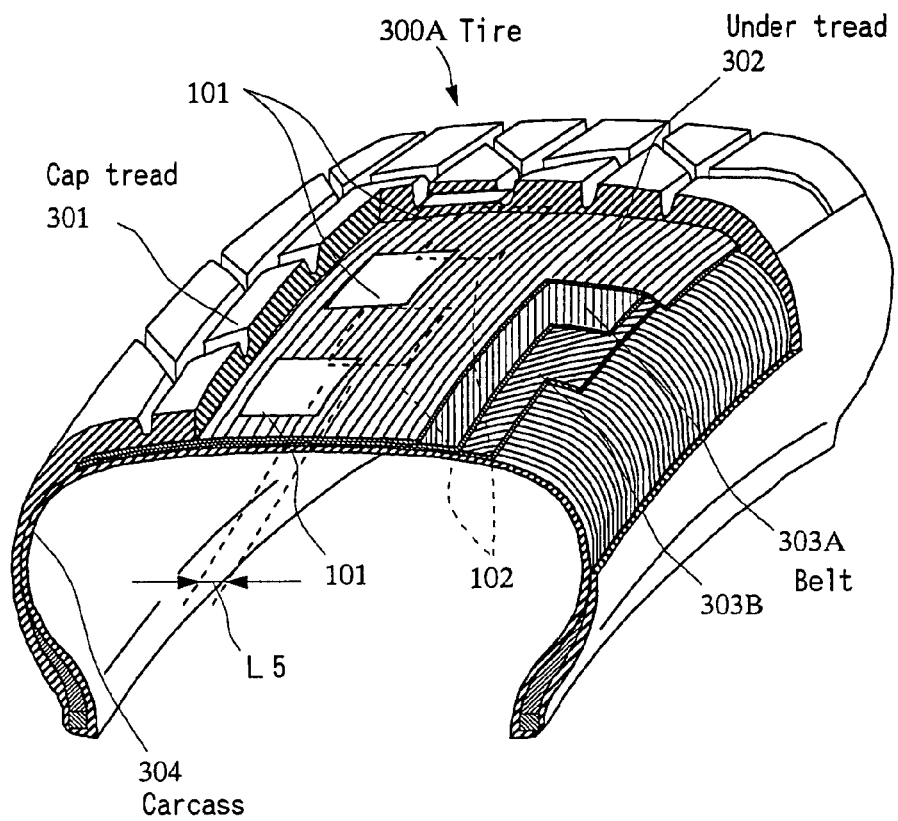
FIG. 15 is cutaway view showing a state of embedding metal foils in the tire according to Embodiment 3 of the present invention.
Figure 16:
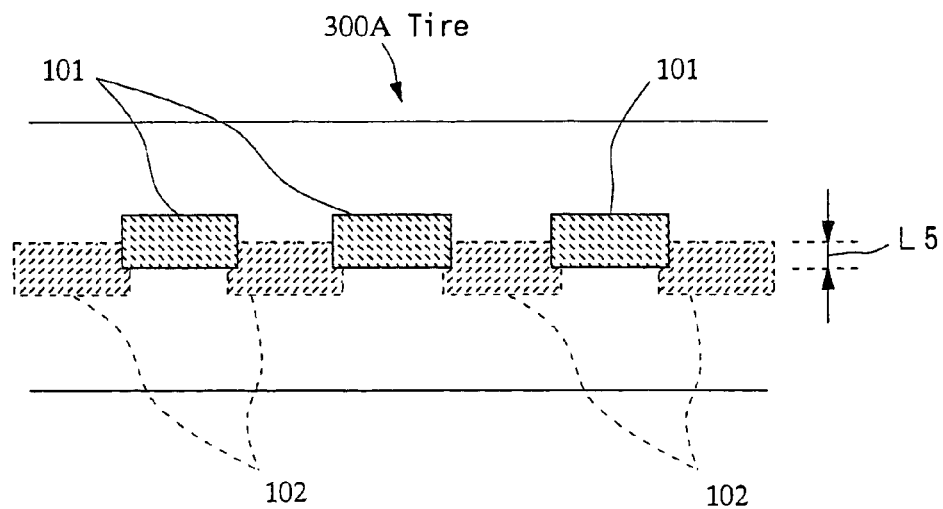
FIG. 16 is a top view for explaining a state of embedding the metal foils in the tire according to Embodiment 3 of the present invention.

Moreover, according to Embodiment 3 of the present invention, as shown in FIGS. 15 and 16, a tire 300A is provided instead of the tire 300 of Embodiment 1. Embodiment 3 is different from Embodiment 1 only in the tire 300A.

In the tire 300A, a series of conductors composed of a plurality of metal foils 101 and a series of conductors composed of a plurality of metal foils 102 are displaced in opposite directions along the width of the tire 300A. Besides, the widths of the metal foil 101 and the metal foil 102 are set as Embodiment 1 and only a width L5 of an overlap of the metal foil 101 and the metal foil 102 is set smaller than that of Embodiment 1. Therefore, it is possible to increase the accuracy of detecting a distortion in the width direction of the tire 300A.

The above-described embodiments are specific examples of the present invention and thus the present invention is not limited to these embodiments. For example, it is needless to say that the same effect can be obtained by a configuration having the metal foils 101 and 102 on the side wall of the tire.

Further, although a pulsed electromagnetic wave has a frequency of 2.45 GHz in the above-described embodiments, the frequency is not particularly limited. As described above, a frequency at 1 GHz or higher can remarkably reduce the influence of a reinforcing metal in the tire that reflects and interrupts an electromagnetic wave, thereby detecting a distortion of the tire with high accuracy. Moreover, it is preferable to properly set a frequency of a pulsed electromagnetic wave in consideration of the influence of the reinforcing metal and so on in designing.

Moreover, it is needless to say that these embodiments are applicable to sensors for a traction controller or a device which performs active control on a suspension, a stabilizer in the suspension, and so on.

INDUSTRIAL APPLICABILITY

As described above, according to the present invention, a workload for manufacturing a tire can be reduced as compared with the conventional art, applicability is widened to a control system such as a stability control system, a deterioration and a damage in a sensor unit can be reduced that are caused by heat generated on the tire during the running of the vehicle, and a distortion of the tire can be detected with high accuracy.

The invention claimed is:

1. A tire distortion detecting method for detecting a distortion of a rotating tire by using a tire, in which a plurality of conductor pieces embedded in lines at predetermined intervals in a circumferential direction of the tire are embedded in two or more different layers, and a monitoring device which has a scanner unit provided in a tire house of a vehicle, characterized in that the monitoring device radiates a pulsed electromagnetic wave from the scanner unit to a surface of the conductor piece along the line of the conductor pieces in each of the layers, causes the scanner unit to receive the pulsed electromagnetic wave reflected from the conductor piece in each of the layers and a member other than the conductor pieces, repeatedly measures time from when the pulsed electromagnetic wave is radiated to when the reflected pulsed electromagnetic wave is received, stores, as a reference value, time at which no distortion occurs on the tire, and compares the measured time with the stored reference value to detect a distortion of the tire.

2. The tire distortion detecting method according to claim 1, characterized in that the monitoring device radiates one or more pulsed electromagnetic waves in an interval of a smaller distance or length out of a distance between the conductor pieces adjacent to each other in the circumferential direction of the tire or a length of the conductor piece arranged in the circumferential direction of the tire, so that the time measurement is conducted on all the conductor pieces and between the adjacent conductor pieces.

3. The tire distortion detecting method according to claim 1, characterized in that the monitoring device uses a frequency of 1 GHz or higher to radiate the pulsed electromagnetic wave.

4. A tire distortion detector for detecting a distortion of a tire in running of a vehicle, the detector being constituted of: a tire, in which a plurality of conductor pieces embedded in lines at predetermined intervals in a circumferential direction of the tire are embedded in two or more different layers, and a monitoring device which has a scanner unit provided in a tire house of the vehicle, characterized in that the monitoring device comprises: means for radiating a pulsed electromagnetic wave from the scanner unit to a surface of the conductor piece along the line of the conductor pieces in each of the layers of the tire, means which is provided in the scanner unit and receives the pulsed electromagnetic wave reflected by the conductor piece in each of the layers of the tire and a member other than the conductor piece, means for measuring time from radiation of the pulsed electromagnetic wave to reception of the reflected pulsed electromagnetic wave, means for alternately repeating the radiation of the pulsed electromagnetic wave and the reception of the reflected pulsed electromagnetic wave, means for storing, as a reference value, time at which no distortion occurs on the tire, and means for comparing the measured time and the stored reference value to detect a distortion of the tire.

5. The tire distortion detector according to claim 4, characterized in that the conductor pieces are embedded in the tire so that surfaces of the conductor pieces are almost in parallel with a surface of a tire tread.

6. The tire distortion detector according to claim 4, characterized in that the conductor pieces are embedded in the tire so that the surfaces of the conductor pieces are almost in parallel with a surface of a side wall of the tire.

7. The tire distortion detector according to claim 4, characterized in that the pulsed electromagnetic wave is set at a frequency of 1 GHz or higher.

8. The tire distortion detector according to claim 4, characterized in that at least in an outermost line of the conductor pieces relative to an axis of rotation of the tire at the center, the conductor pieces are arranged at regular intervals in the circumferential direction of the tire to set a length of the conductor piece in the circumferential direction of the tire equal to a length of a gap between the adjacent conductor pieces.

9. The tire distortion detector according to claim 4, characterized in that the conductor pieces are arranged so that in a second series of conductors provided inside a first series of conductors, ends of the conductor piece in the circumferential direction of the tire overlap, by a predetermined length, ends of the conductor piece in the circumferential direction of the tire in the first series of conductors which is outermost relative to an axis of rotation of the tire at the center.

* * * * *

UNITED STATES PATENT AND TRADEMARK OFFICE
CERTIFICATE OF CORRECTION

PATENT NO. : 7,302,836 B2  Page 1 of 1
APPLICATION NO. : 10/505215
DATED : December 4, 2007
INVENTOR(S) : Yutaka Hattori It is certified that error appears in the above-identified patent and that said Letters Patent is hereby corrected as shown below:

On the title page, item [54] and column 1-3, (Title), lines 1-3, which reads, "METHOD FOR DETECTING STRAIN STATE OF TIRE, DEVICE FOR DETECTING STRAIN STATE, AND THE TIRE", should read -- TIRE DISTORTION DETECTING METHOD, DISTORTION DETECTOR, AND TIRE THEREOF --

Title page, item [56] column 1 (U.S. Patent Documents), line 1 after "4,953,393" which reads, "A", should read -- B1 --

Title page, item [56] column 2 (U.S. Patent Documents), line 1 after "5,895,854" which reads, "A", should read -- B1 --

Title page, item [56] column 2 (Other Publications), line 1 which reads, "Rerport", should read -- Report --

Column 1, line 61 which reads, "a axis" should read -- an axis --

Column 5, line 55 after "invention" which reads, ".", should read -- ; --

Signed and Sealed this

Twenty-ninth Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 7,302,836 B2  Page 1 of 1
APPLICATION NO. : 10/505215
DATED : December 4, 2007
INVENTOR(S) : Yutaka Hattori It is certified that error appears in the above-identified patent and that said Letters Patent is hereby corrected as shown below:

On the title page, item [73]: (Assignee), line 5, which reads, "Yokohama Rubber Company," should read, -- Yokohama Rubber Co., Ltd. --

Signed and Sealed this

Twenty-third Day of March, 2010

David J. Kappos
*Director of the United States Patent and Trademark Office*